United States Patent [19]

Forshee

[11] Patent Number: 4,471,867

[45] Date of Patent: Sep. 18, 1984

[54] PLASTIC MONORAIL CONVEYOR STRUCTURE

[75] Inventor: David J. Forshee, Hilton Head, S.C.

[73] Assignee: Formall Syn-Trac Systems, Inc., Madison Heights, Mich.

[21] Appl. No.: 395,509

[22] Filed: Jul. 6, 1982

[51] Int. Cl.³ .............................................. B65G 17/32
[52] U.S. Cl. ..................................... 198/687; 104/95; 104/111; 105/154
[58] Field of Search ............... 198/473, 477, 678, 683, 198/685, 687; 104/91, 93, 95, 99, 111; 308/207 R, 208, 209, 216; 105/154

[56] References Cited

U.S. PATENT DOCUMENTS

| | | | |
|---|---|---|---|
| 644,528 | 2/1900 | Marcy | 308/209 |
| 935,042 | 9/1909 | Miller | 104/91 |
| 1,429,118 | 9/1922 | Townsend | 105/154 |
| 1,778,484 | 10/1930 | Da Costa | 198/687 |
| 1,785,315 | 12/1930 | Kennedy | 198/687 |
| 2,095,022 | 10/1937 | Bishop | 198/687 |
| 2,129,380 | 9/1938 | Morgan | 198/687 |
| 3,696,890 | 10/1972 | Armstrong | 104/93 |
| 4,157,751 | 6/1979 | Grundken et al. | 198/735 |
| 4,228,738 | 10/1980 | Forshee | 198/687 |

FOREIGN PATENT DOCUMENTS

| | | | |
|---|---|---|---|
| 714393 | 7/1965 | Canada | 198/685 |
| 702489 | 1/1954 | United Kingdom | 198/678 |

Primary Examiner—Joseph E. Valenza
Assistant Examiner—Jonathan D. Holmes
Attorney, Agent, or Firm—Benjamin W. Colman

[57] ABSTRACT

A monorail conveyor system having an inverted plastic T-bar monorail track suspended from supporting structural members conjoined by conventional bolt and nut fasteners, a plurality of plastic conveyor trolleys operatively movable on the T-bar monorail by a drive chain comprising a plurality of plastic chain links articulatedly connected together, the drive chain being driven by conventional conveyor drive chain power mechanism. Each plastic T-bar monorail track section comprises an upstanding stem having a laterally extending pendant lobe on each side thereof and a pair of laterally outwardly directed flanges at the distal end of said stem for both horizontal and inclined travel of the conveyor trolleys. The monorail conveyor structure includes a variety of plastic fittings for connecting the plastic T-bar monorail track sections together and to supporting structural members, a plastic turn wheel for supporting the conveyor trolleys in their translation on the monorail track at a turn or bend in the track, and plastic sway braces to maintain T-bar monorail supporting rods in a relatively fixed angular relationship.

35 Claims, 47 Drawing Figures

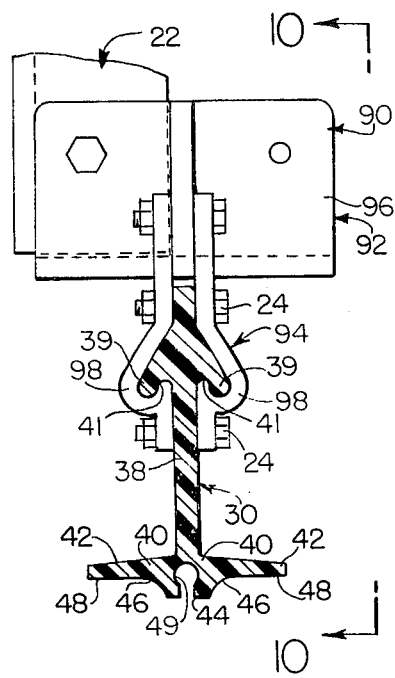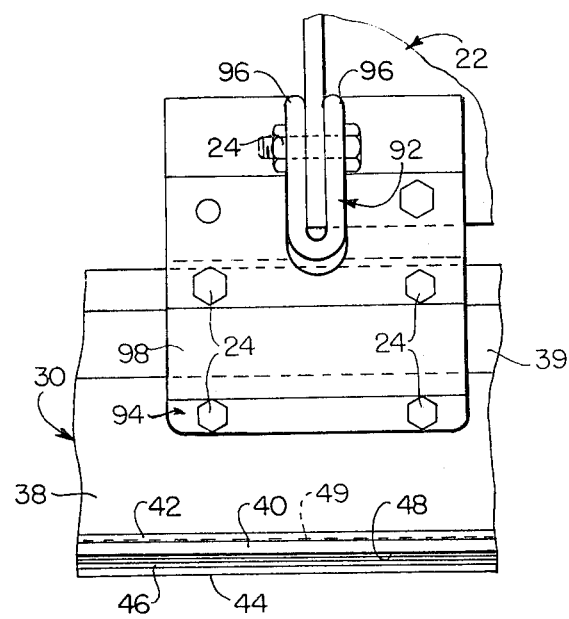
FIG. 9  FIG. 10
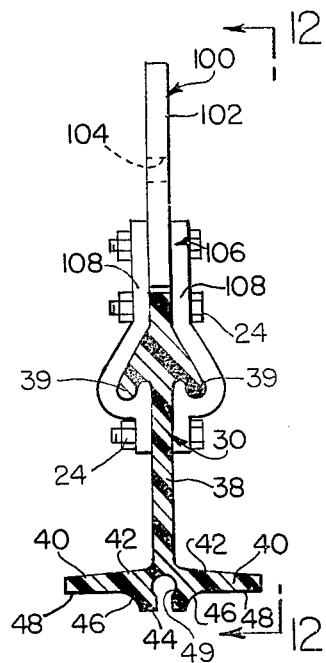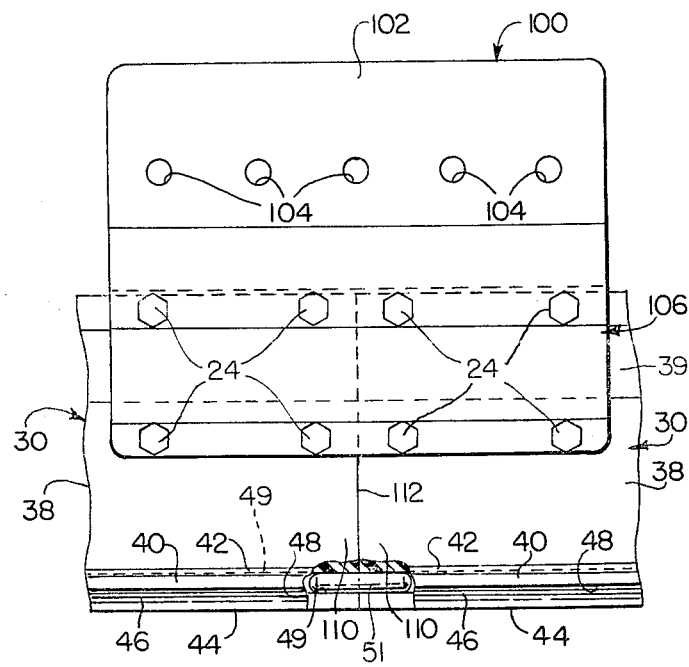
FIG. 11  FIG. 12

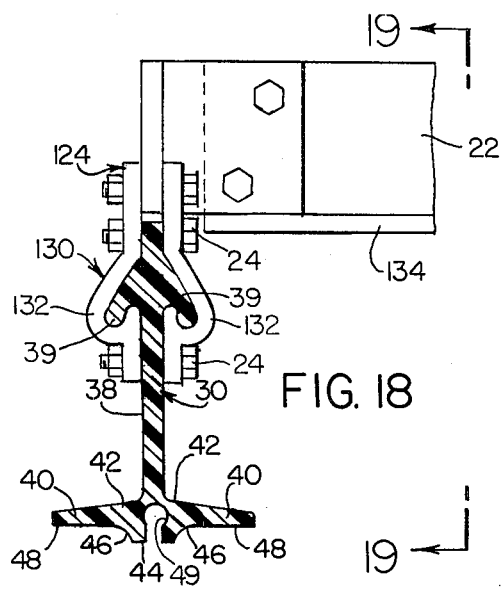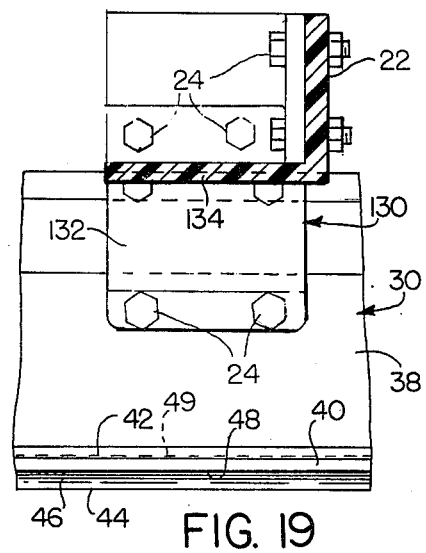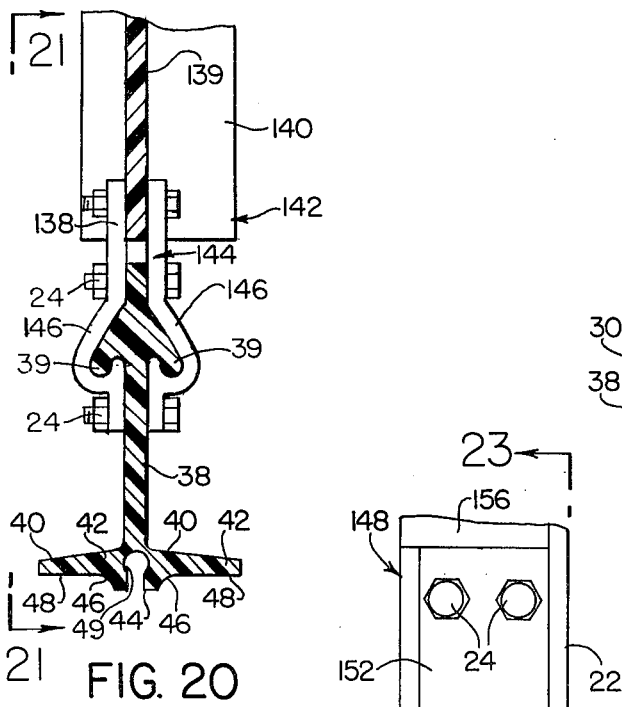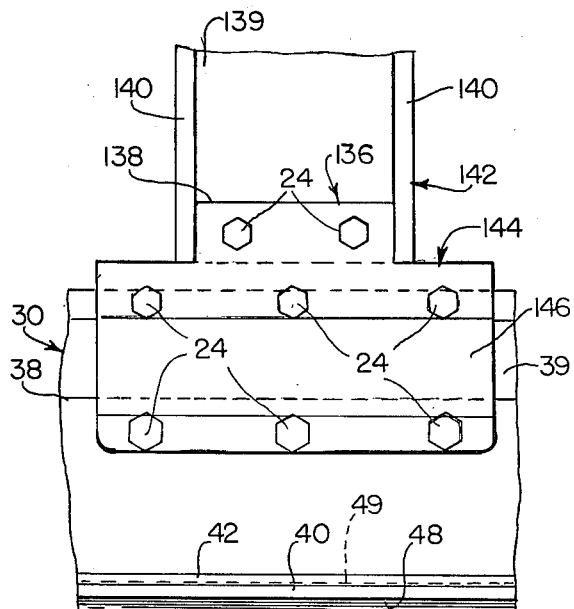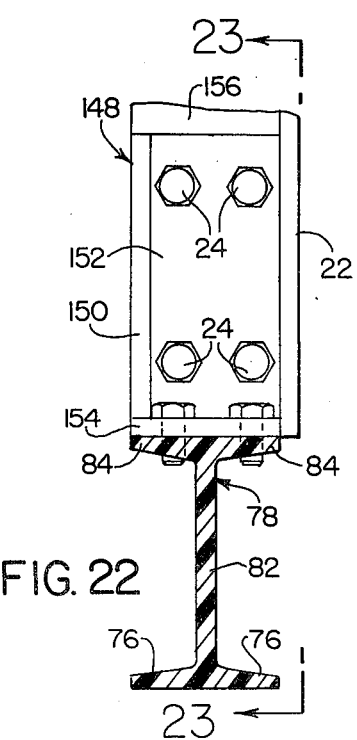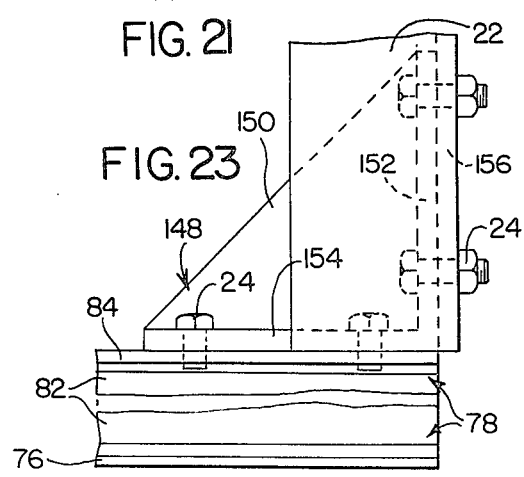

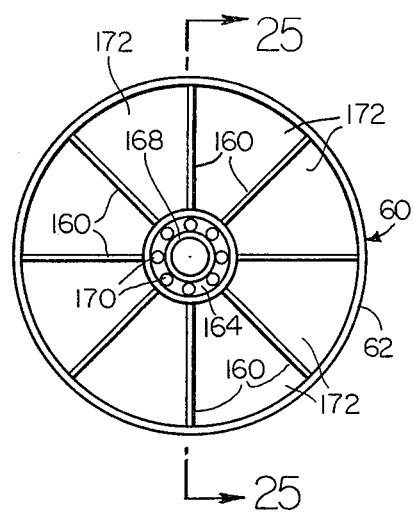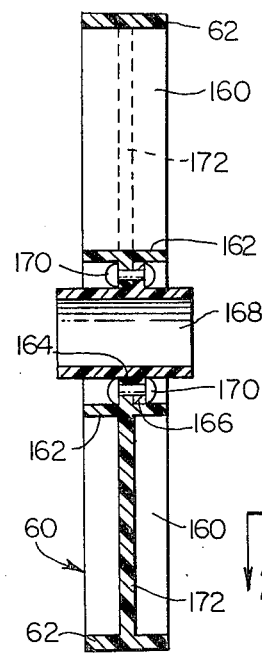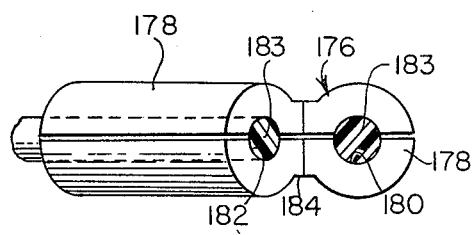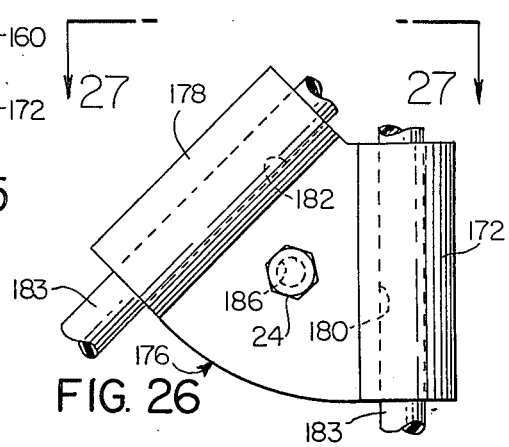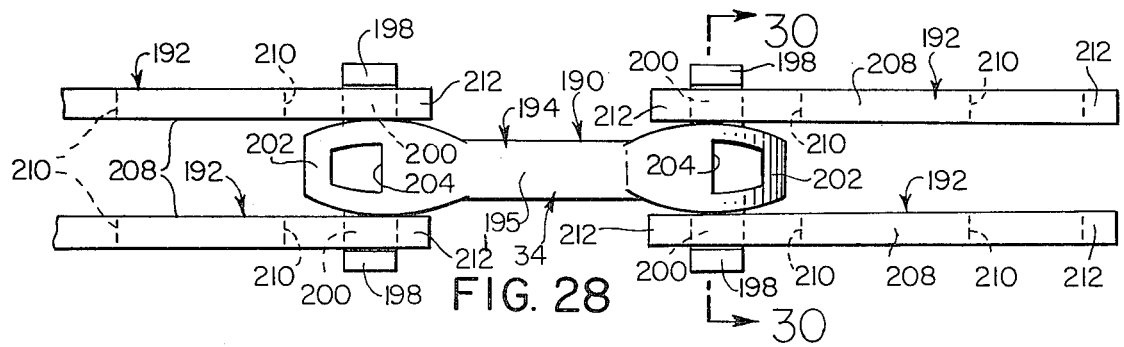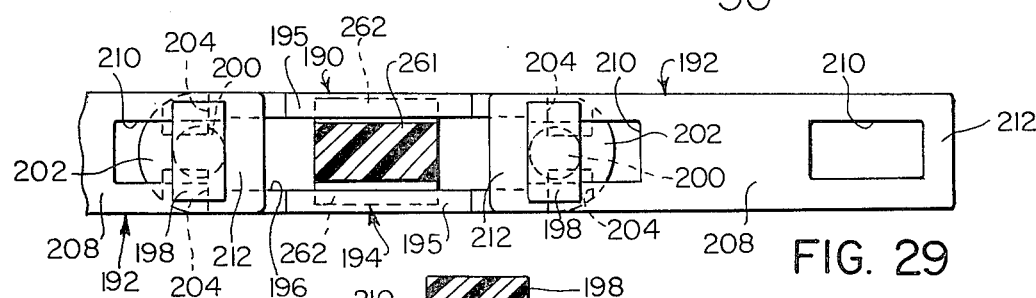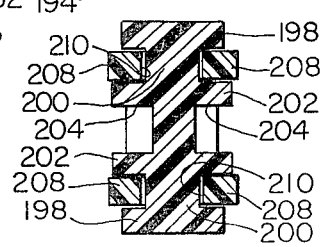

PLASTIC MONORAIL CONVEYOR STRUCTURE

BACKGROUND OF THE INVENTION

This invention relates to a monorail conveyor system. Such conveyor systems in the past has been made primarily of steel components suspended from steel supporting members welded to the building superstructure, the monorail comprising continuous lengths of I-beam welded together at their ends. The monorail system has included steel conveyor trolleys movable upon the I-beam monorail by steel driven chain linkage engageable with the trolleys. This type of monorail conveyor system has been in operation for many many years with little, if any, modification.

The problems attending such prior art monorail conveyor systems have included high initial material and installation costs, high maintenance and repair costs, and very high noise pollution, and a lack of color coding for safety and identification purposes. Because the principal components of steel monorail conveyor systems must be welded together, skilled workmen at high hourly rates are required to make these installations. Also, skilled tradesmen are required to assemble this equipment and install the same from supporting superstructure. Maintenance costs are high because these same skilled workmen are required to replace or repair damaged components or portions thereof. Since paint or exterior finishes adhere very poorly to steel surfaces located and operating in areas and atmospheres having a relatively oily or chemical content, it is practically impossible to maintain a color on the monorail components which would function as a signal that such apparatus is present and that there may be danger to personnel in its area of operation. The lack or failure of color coding monorail equipment also constitutes an insufficiency to provide an identification of the components which are or can be carried by the system. The high decibel noise quotient results in major part from the difficulty in welding sections of the monorail in a level attachment of the I-beam trolley riding surfaces, so that a loud clickety-clack occurs each time a trolley rides across a juncture of the monorail I-beam. Where hundreds of such junctures and trolleys are present, the conveyor noise is, in some instances, highly discomforting, decreasing worker efficiency.

SUMMARY OF THE INVENTION

This invention relates to a plastic monorail conveyor structure. The supporting structure secured to the building superstructure (generally of steel trusses) is fabricated of plastic components from which is suspended an inverted plastic T-shaped monorail capable of supporting a plurality of moving plastic trolleys having parts hangers supsended therefrom. The component members of the supporting structure are preferably made of a strong durable plastic material such for example, but not limited to, the DuPont Zytel ® ST nylon polyamide produced by the E. I. DuPont DeNemours & Company of Wilmington, Del. The conveyor trolleys of this invention are also preferably made of the Zytel ® ST nylon material and/or of the Delrin ® crystalline acetal resin material made by the polymerization of formaldehyde. Either of these materials can be mixed with a fiberglass concentrate to add further strength to the plastic resin. The amount of such fiberglass additive is proportional to the weight load of the conveyor trolleys, the parts to be carried thereby, the monorail and its supporting structural members. And as the load or weight requirements of these components increase, the percentage of fiberglass used with the resin material may also be increased.

The high weight load of the steel I-beam monorail, the steel trolleys carried thereon and their steel supporting structural components has been eliminated. Such high weight loads call for the consumption of large quantities of power and the energy to produce such power. Such loads mean a relatively short service life before expensive and difficult service and repairs are required. Such loads subject the monorail system to premature corrosion and failure. These and other functional limitations are avoided and eliminated by the instant invention.

The coefficient of friction of the plastic materials used in the T-shaped monorail and trolleys is extremely low, therefore lubrication of moving parts is not required. This feature alone eliminates considerable expensive lubrication equipment, service facilities, installation and maintenance. Removal of lubricants from the site substantially eliminates one major source of contaminants dripping upon fresh or processed foods carried by or located under the conveyor system in food processing plants.

The weight reduction in the use of plastic conveyor supporting members, a plastic T-shaped monorail and the plastic trolleys is of the order of about 80% less than is present in a steel conveyor system. Such weight reduction not only extends the life of the monorail itself but also the service life of the entire conveyor system. The weight reduction lowers significantly the size and capacity of drive motors and drive mechanism, with a consequent significant reduction in energy consumption.

The plastic monorail and trolley system of this invention is extremely advantageous in areas where severely corrosive chemical vapors are present and where caustic wash solutions are sprayed. These corrosive chemicals cause a breakdown in the lubrication system, in turn destroying the roller bearing assemblies in the trolleys. The corrosion occurring in the steel monorail itself further contributes to early conveyor failure and consequent high maintenance costs.

In every respect, the plastic supporting structural components, the plastic T-shaped monorail and the plastic trolleys of this invention permit lower replacement costs for these components, and much easier service if repair is required. Installation of the equipment is made with conventional fasteners such as bolts, washers and nuts, by relatively unskilled labor at much lower cost in comparison with a steel conveyor system. Removal of defective or failing parts is quickly and easily made by such relatively unskilled labor, reducing down time for the conveyor system.

The plastic T-bar monorail and trolleys effect a tremendous reduction in decibel readings in the conveyor zone, a significant advantage in terms of noise abatement and/or pollution, in constrast with extremely noisy overhead steel monorail installations having mismatches and unevenness in weld joints along the I-beam monorail. Such noise causes considerable personnel discomfort and reduces worker efficiency in the conveyor zone.

As to the instant invention, should the T-bar monorail sections be mismatched at abutting junctures, there will be little if any noise and little if any damage to trolleys or suspended parts because of the shock absorption in the plastic trolleys and T-bar monorail as the mismatched juncture is crossed.

Because the plastic resin materials allow for the engineering and production of precision assemblies, secondary drilling of holes or alignment of details are unnecessary prior to connecting the T-bar monorail sections to the supporting structure and mounting the trolleys on the monorail.

Color coding of the plastic trolley assemblies and the monorail sections enables parts identification to be more readily made, particularly on mixed model conveyor systems. Such color coding of the T-bar monorail and trolleys, particularly in bright colors, signals the presence of moving objects and provides a greater measure of safety to personnel in the operation of the plastic monorail conveyor system.

Normally, a monorail parts conveyor trolley track is arranged in an endless loop, for continuous circling of the trolleys and their suspended parts hangers upon the track. Under some circumstances, the trolleys can be chain driven in a reciprocating manner, i.e. first traveling in one direction and then in a reverse direction on the track. The plastic components of the monorail conveyor structure hereindisclosed can function in either manner.

BRIEF DESCRIPTION OF THE DRAWINGS

Various further and more specific objects, features and advantages of the invention will appear from the description given below, taken in connection with the accompanying drawings, illustrating by way of example preferred forms of the invention. Reference is here made to the drawings annexed hereto forming an integral part of this specification.

FIGS. 9 and 10 are vertical sectional and side elevational views respectively of a plastic connecting bracket for the plastic T-bar monorail and a supporting plastic angle.

FIGS. 11 and 12 are vertical sectional and side elevational views respectively of a plastic hanging bracket and splice for abutting sections of the plastic T-bar monorail.

FIGS. 18 and 19 are vertical sectional and side elevational views respectively of a plastic angle bar support member for the plastic T-bar monorail.

FIGS. 20 and 21 are vertical sectional and side elevational views respectively of a plastic hanging bracket for the plastic T-bar monorail.

FIGS. 22 and 23 are vertical sectional and side elevational views respectively of a plastic angle bracket by which to suspend a plastic supporting I-beam from an angle, for connection to a T-bar monorail from the I-beam by clamp members as illustrated in FIGS. 7 and 8.

FIG. 24 is a top plan view of a turn wheel for the conveyor structure.

FIG. 25 is a transverse sectional view taken substantially on the line 25—25 of FIG. 24.

FIGS. 26 and 27 are side elevational and top plan views of a plastic 45-degree sway brace for connection to plastic structural rods to support the plastic T-bar monorail.

FIGS. 28 and 29 are side elevational and top plan views respectively of plastic drive chain linkage members for moving the plastic trolleys operatively along on the plastic T-bar monorail.

FIG. 30 is a transverse vertical sectional view taken substantially on the line 30—30 of FIG. 28.

DESCRIPTION OF THE PREFERRED EMBODIMENTS

Figure 1:
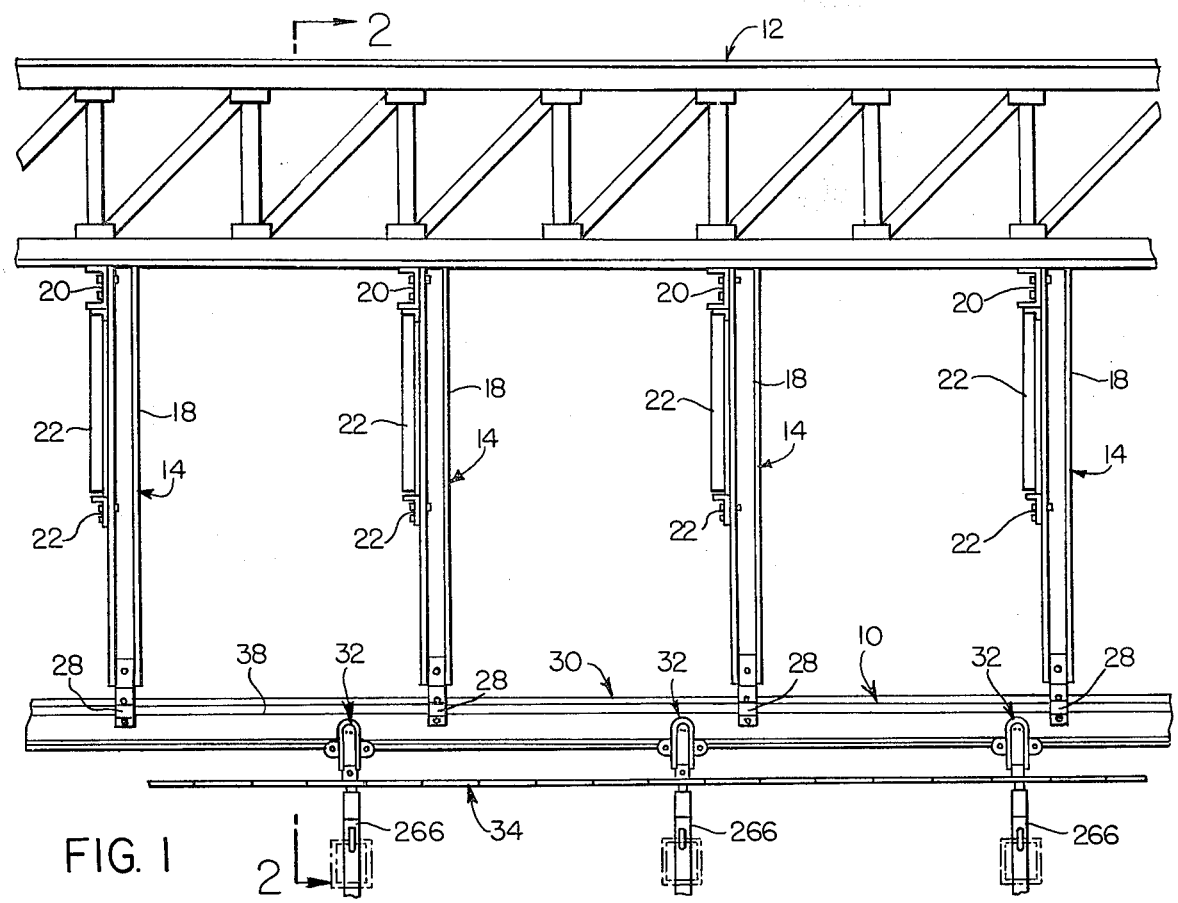
FIG. 1 is a front elevational view of a straight portion of the plastic monorail conveyor structure showing steel building tresses, the plastic supporting structure attached thereto, the plastic monorail, and plastic trolleys suspended from the monorail with an engaged plastic drive chain and pendant parts hangers.
Figure 2:
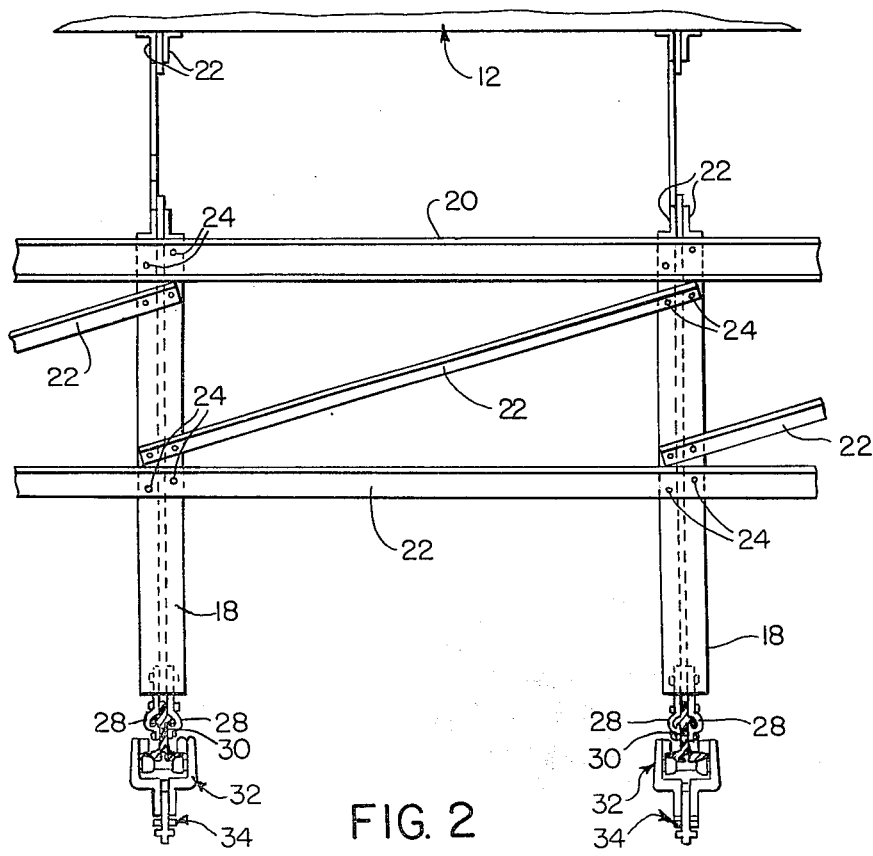
FIG. 2 is a transverse vertical sectional view taken substantially on the line 2—2 of FIG. 1.
Figure 3:
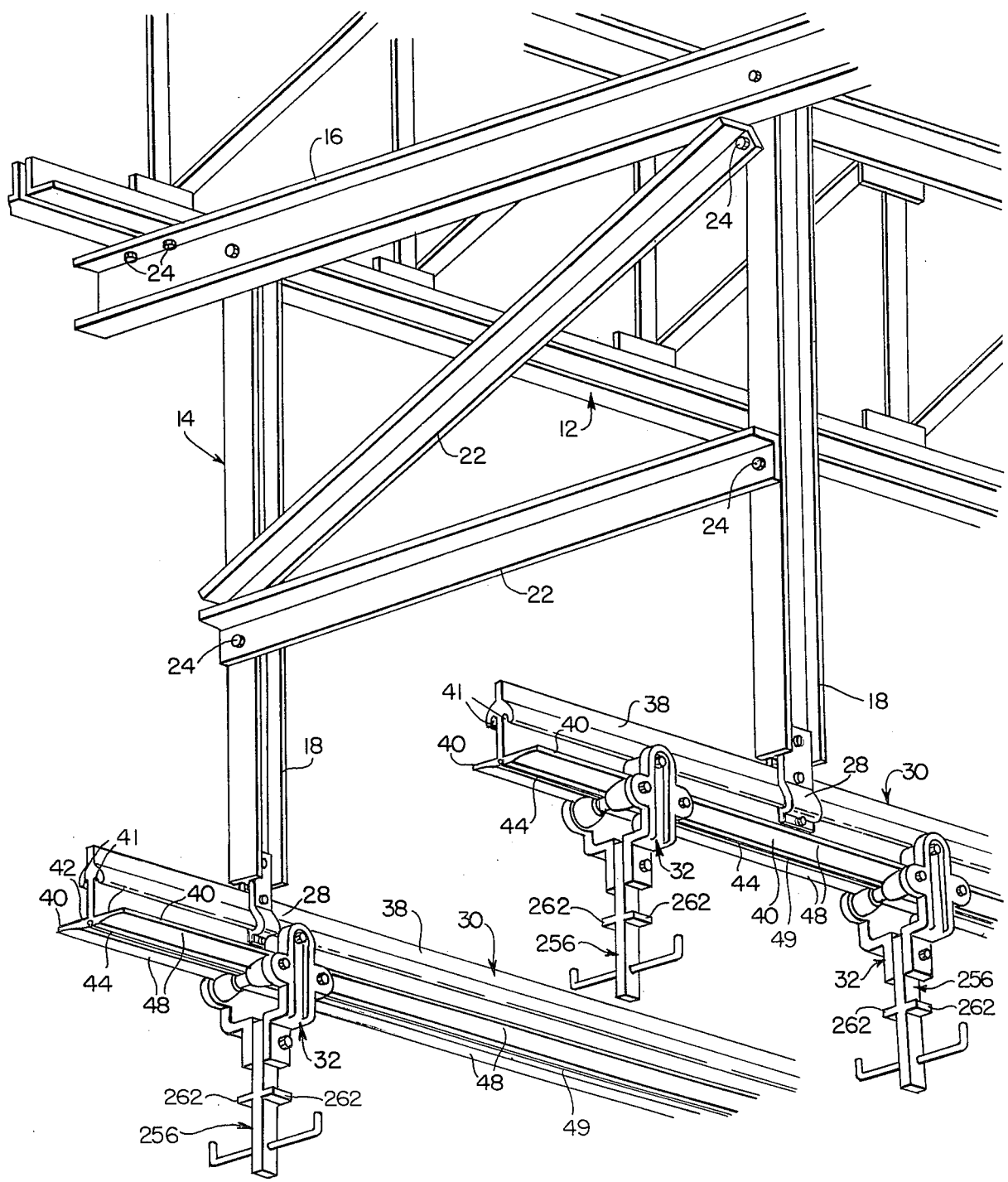
FIG. 3 is a somewhat enlarged fragmentary perspective view of parallel sections of the monorail structure with trolleys suspended therefrom, but absent a showing of the drive chain.

A preferred embodiment of the invention is illustrated in the several drawings forming an integral part of this specification. The plastic monorail conveyor structure 10 is suspended from a steel roof truss 12 by a plastic supporting structure 14. As shown more particularly in FIGS. 1, 2 and 3, the supporting structure 14 comprises a plurality of plastic channel members 18 and 20 and angle members 22 connected together by bolts, washers and nuts, to the roof truss 12 or to the steel channels 16 immediately therebelow.

The conveyor structure 10 involves more particularly an inverted plastic T-shaped monorail track and a plurality of plastic trolleys operatively driven on the track by an endless plastic chain linkage. The T-bar monorail is suspended at its upstanding longitudinally extending stem from the supporting plastic structure 14 by plastic brackets, connectors and hangers, several of which are disclosed hereinafter below.

The plastic monorail conveyor structure 10 comprises a plurality of longitudinally extending inverted plastic T-bar sections 30 connected in an endless series and secured by bracket members 28 to the supporting superstructure 14, a plurality of plastic conveyor trolleys 32 operatively driven thereon, and the plastic drive chain 34 operatively engaged with the trolleys 32. Arcuate T-bar sections 50, 50A and 50B (FIGS. 15, 16, 17) also form portions of the monorail track.

The supporting structural members 18, 20 and 22 are secured together, and to the steel superstructure, by bolt, washer and nut fasteners 24 throughout.

The inverted plastic T-bar section 30 comprises a longitudinally extending upstanding stem 38 having pendant lobes 39,39 extending laterally outwardly from each side of the stem body, and the laterally directed longitudinally extending flanges 40,40 which lie substantially in a plane on either side of the stem 38 at its distal edge. Each lobe 39 and the adjacent lateral surface of stem 38 form a longtudinally extending recess or slot 41 therebetween. The upper flange surfaces 42,42 are inclined slightly downwardly, generally at an angle of approximately 7 degrees to the horizontal plane. The undersides of the flanges 40,40 are designed cross-sectionally with a medial depending web porton 44 defined at its lateral edges by upwardly outwardly curved surfaces 46,46 blending into substantial horizontal lateral surfaces 48,48. The lower end of the stem 38 is provided with a medial longitudinally extending key slot 49 for reception of a plastic pin 51 which is press fit into the end portions of abutting track sections to prevent sideways misalignment.

Figure 4:
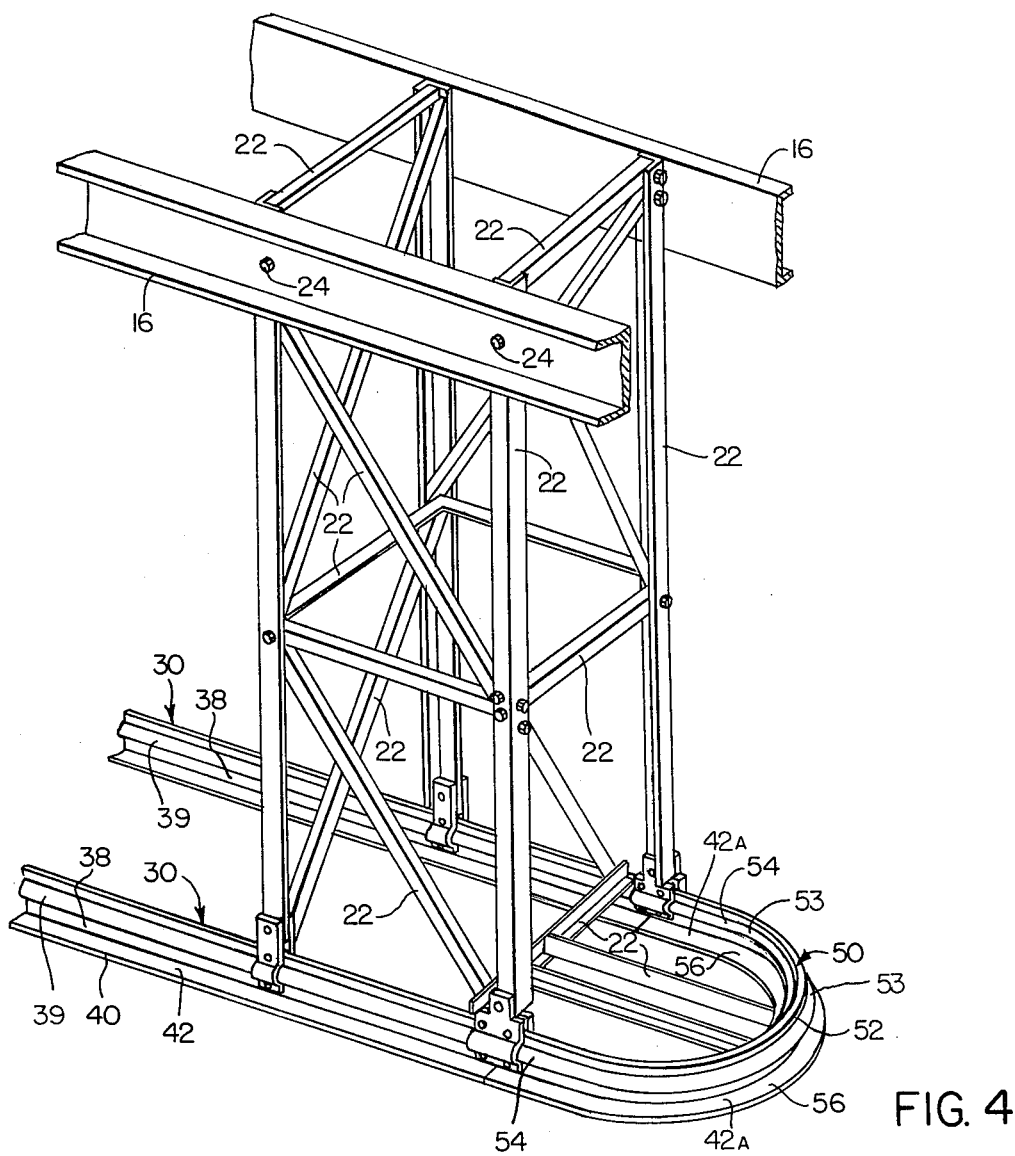
FIG. 4 is a perspective view of the plastic monorail track and supporting-structure at a 180° bend.

The reference numeral 30 denotes monorail straight sections which are connected together by splice fittings at abutting edges. The track is also provided with 180-degree curved sections 50 (FIGS. 4,15), 90-degree curved sections 50A (FIGS. 5,6,16), and other arcuate configurations as well (FIG. 17), depending upon the requirements of particular applications for which the plastic monorail structure is designed. Vertical curvature of the T-bar monorail, in a lineal direction, can also be effected, the straight planar sections 30 being conjoined with such curved section(s) by suitable brackets at the latters' distal ends. The structural features described above for the T-bar section 30 are also present in the arcuate sections.

The 180-degree arcuate T-bar section 50 comprises the longitudinally extending arcuate upstanding stem portion 52 with lobes 53,53, terminating adjacent each distal end in straight portions 54,54 which align with and smoothly abut the ends of adjacent straight T-bar sections 30,30. The laterally extending flanges 56,56 of the arcuate section 50 are constructed with the same cross sectional configuration as has been described above for the flanges 40,40 of the straight T-bar monorail section 30, i.e. the flanges have upper surfaces 42A,42A which are slightly downwardly inclined from the upstanding stem, and lower surfaces which are arcuately curved upwardly and outwardly from the medial web portion and blend into the straight horizontal planar surfaces adjacent the distal edges of the flanges 56,56.

The 90-degree arcuate T-bar segment 50A (FIGS. 5, 6) bear the same reference numerals and have the same cross-sectional design and configuration as has been illustrated and described for the 180-degree T-bar arcuate section 50.

For a 90-degree turn or a 180-degree turn in the conveyor monorail, a plastic traction turn wheel 60 is rotatably supported on plastic framing members 22,22 as a guide and support for the trolleys 32 as they are pulled around the T-bar section 50A (FIG. 5) and upon the outer peripheral surface 62 of the wheel 60. At times, a simple plastic support plate 66 is suspended laterally of and below the arcuate T-bar section 50A (FIG. 6) as a bearing surface for the trolleys 32 to ride against.

Figure 15:
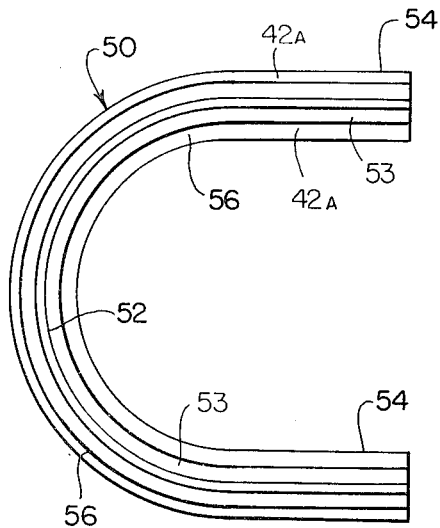
FIGS. 15, 16 and 17 are top plan views of 180-degree, 90-degree and 45-degree plastic T-bar monorail segments.
Figure 16:
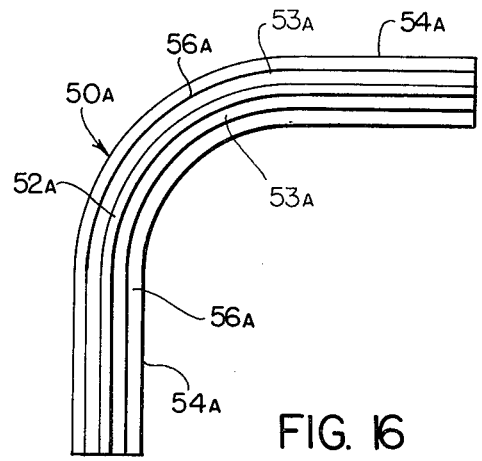
Figure 17:
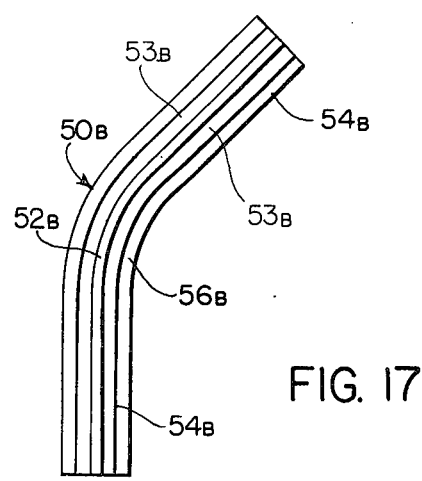

Top plan views of plastic arcuate T-bar monorail sections 50,50A and 50B are shown in FIGS. 15,16 and 17. The 45-degree arcuate segment 50B is illustrated in FIG. 17 and comprises the upstanding arcuate stem 52B, the lateral outwardly extending flanges 56B,56B having the same configuration as in the straight T-bar section 30, and the distal end straight portions 54B,54B.

Representative examples of plastic hangers, connectors and splices to support and connect the T-bar monorail sections 30,50,50A and 50B from and by the plastic supporting structure 14 are illustrated in FIGS. 7,8,9,10,11,12,13,14,18,19,20,21, 22,23,26 and 27. In each instance the connecting members or devices have portions which are secured and attached to the T-bar upstanding stem 38,52,52A or 52B, and to the supporting structural member immediately adjacent thereabove.

Figure 7:
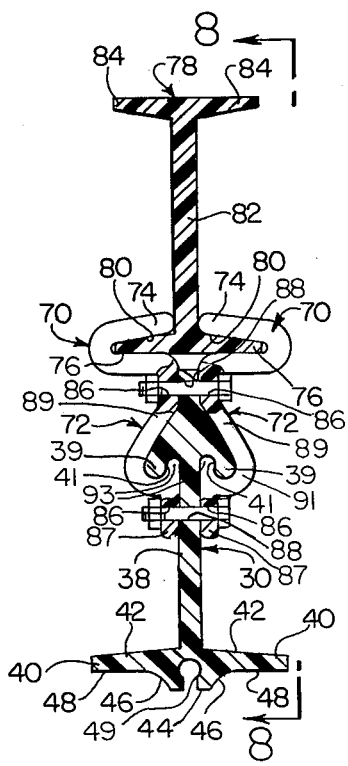
FIGS. 7 and 8 are vertical sectional and side elevational views respectively of a plastic bracket in the form of matching opposedly facing clamp members, supporting the plastic T-bar monorail from a plastic I-beam.
Figure 8:
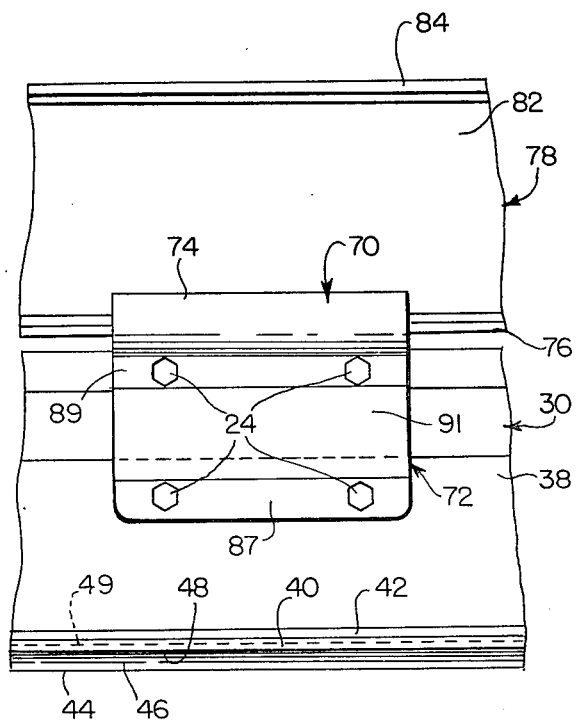

As shown in FIGS. 7 and 8, the plastic clamp members 70,70 comprise plastic bracket members 72,72 terminating at their upper edges in return flange elements 74 adapted to encompass and seat upon portions of the lower laterally extended flanges 76,76 of the plastic I-beam 78, i.e. within the clamp flange element recesses 80. The I-beam 78 is further provided with a web portion 82 and the upper laterally extending flanges 84,84. The clamp-type bracket members 72 are each provided with bolt openings 86 in its distal flange portion 87 in register with bolt openings 88 in the upstanding stem 38 of the T-bar section 30 for admission of fasteners 24 therethrough. The bracket member 72 further comprises a proximal flange portion 89 having bolt openings 86 therethrough, an intermediate flange portion 91 having an upwardly extending rib 93 seated within the lobe recess or slot 41.

The connecting bracket 90 (FIGS. 9,10), secured to the T-bar stem 38 by conventional fasteners 24, comprises the folded yoke portions 92,94 at right angles to each other, upper yoke portion 92 having parallel spaced apart plate segments or bracket members 96,96 and lower yoke portion 94 having parallel bracket segments 98,98. The bracket segments of each yoke section are suitably perforated to provide bolt openings in register with bolt openings in the supporting member and T-bar stem for fasteners 24 passed therethrough to secure the upper yoke 92 to the supporting angle member 22 and the lower yoke bracket segments 98,98 to and on either side of the upstanding stem 38 under and in engagement with the lobes 39 in recesses 41 of the T-bar monorail section 30. The plate segments 98 are provided with lobe engaging elements similar to those described for the bracket members and identified with the same reference numerals.

A hanging bracket and splice fitting 100, for connection to the T-bar section 30, is illustrated in FIGS. 11 and 12. The upper plate portion 102 is provided with a plurality of bolt openings 104 for attachment by conventional fasteners 24 to any of the several kinds of supporting structural members, the fitting 100 having a lower depending yoke portion 106 having parallel spaced apart bracket segments 108,108 on either side of the T-bar stem 38 and suitably perforated with bolt openings for acceptance of fasteners 24 passed therethrough in register with similar bolt openings in the upstanding stem 38 of the T-bar section 30. The yoke bracket segments 108,108 overlie and engage the lobes 39 and splice together the abutting ends 110,110 of adjacent T-bar sections 30,30 at the abutting juncture 112. A similar or identical fitting 100 can be used to splice together a straight section 30 with an arcuate section 50,50A or 50B, or join together two arcuate sections.

Figure 13:
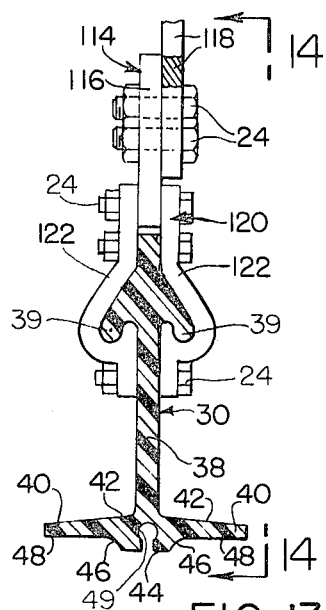
FIGS. 13 and 14 are vertical sectional and side elevational views respectively illustrating another type of plastic hanging bracket and its supporting arms or members for the plastic T-bar monorail.
Figure 14:
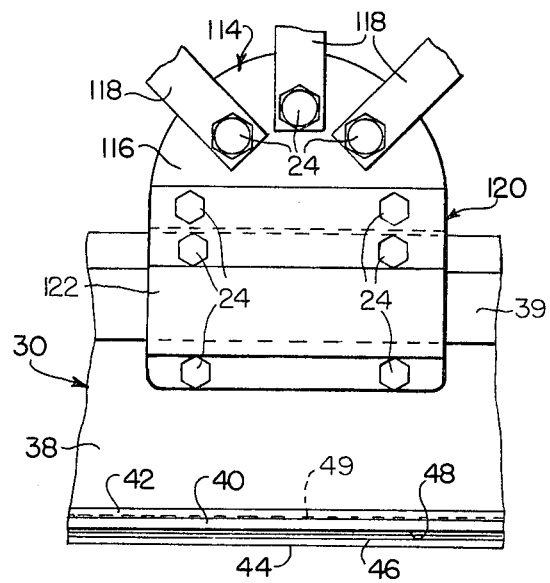

Another plate type hanging bracket 114 is illustrated in FIGS. 13 and 14, that bracket comprising an arcuate upper plate portion 116 suitably perforated with bolt openings for fasteners 24 securing the plate portion to supporting structural members 118 and a lower depending yoke portion 120 having parallel spaced apart bracket segments 122,122 overlying and engaging portions of the lobes 39 on either side of the T-bar stem 38 and suitably provided with bolt openings in register with similar openings in the stem 38 of the T-bar monorail section 30.

The plastic angle connector 124 (FIGS. 18,19) comprises the horizontal leg 126 having a medial upstanding stiffening rib 128, and a depending yoke 130 comprising the parallel spaced apart bracket segments 132,132 engaging and overlying portions of the lobes 39 on either side of the T-bar stem 38 and suitably perforated with bolt openings for the fasteners 24 in register with similar bolt openings in the upstanding stem 38 of the T-bar section 30. The angle plate portion 126 is also provided with suitable bolt openings in register with similar bolt openings in the horizontal angle leg 134 of the supporting structural angle 22.

A slightly modified plastic bracket connector is that illustrated in FIGS. 20 and 21, the connector 136 comprising an upper plate portion 138 attached to the web portion 139 between the lateral legs 140,140 of the H-member 142, and the depending yoke 144 having the parallel spaced apart bracket segments 146,146 engaging and overlying portions of the lobes 39 on either side of the T-bar stem 38 and suitably perforated with bolt openings in register with similar openings in the upstanding stem 38 of the T-bar monorail section 30.

A plastic bracket 148 in combination with a depending plastic I-beam 78 and a plastic supporting structural angle 22 are illustrated in FIGS. 22 and 23. The angle bracket 148 comprises the angulated side wall 150, the right angle side wall 152 and the bottom wall 54 secured to the upper flanges 84,84 of the I-beam 78. The right angle side wall 152 is also secured to the facing leg 156 of the supporting angle 22, and the bottom wall 154 is secured to the upper flanges 84,84 of the I-beam 78, by conventional fasteners 24.

Figure 5:
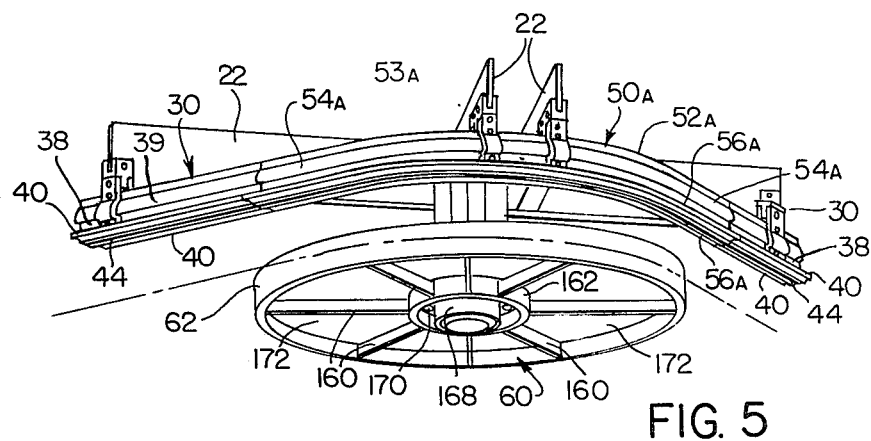
FIG. 5 is a perspective view of the plastic monorail at a 90° bend showing a turn wheel for the trolleys, supported by its superstructure.
Figure 6:
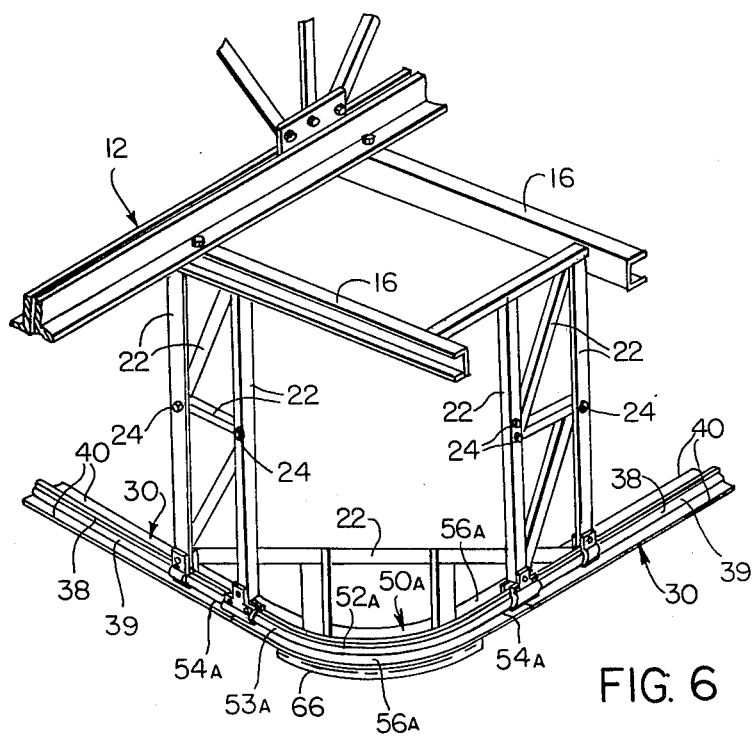
FIG. 6 is a perspective view of a supporting structure for the T-bar monorail for another 90° bend.

The plastic turn wheel 60, illustrated in FIGS. 5, 24 and 25, comprises the outer annular band 62 affixed to the frame spokes or ribs 160, the inner annular band 162, and the inner annular flange 164 secured to the outer annular flange 166 of the hub 168 by rivet-type fasteners 170 or other suitable means. The radial ribs or spokes 160 are integrally formed with and connected to the planar medial radial web portions 172. The turn wheel 60 provides bearing support for the trolleys 32 as they move along on the T-bar sections at changing directions of the monorail.

In some instances plastic sway braces, such as those illustrated in FIGS. 26 and 27, are used in support of the T-bar monorail. The plastic sway brace 176 comprises the matching complementary sections 178,178 which abut each other on a diametric plane through the axes of the longitudinally extending openings 180,182. Plastic rods 183 are passed through the openings 180 and 182 for connection to superstructure members or roof trusses or other supporting means for the T-bar monorail. The web portion 184 of one matching section 178 is provided with an opening 186 in register with a complementary opening in the other matching section 178, so that the mating halves can be bolted together upon the rods and function as a clamp therefor, holding the rods in a fixed angular relationship. The angularity can be modified to 30 degrees or 60 degrees, or any other suitable or desirable angular relationship.

Another important component of the inventive plastic monorail structure 10 is the plastic drive chain 34 for the plastic trolleys. As illustrated particularly in FIGS. 28–30C,39 and 40 inclusive, the plastic drive chain 34 comprises a connected plurality of chain sets having a medial or intermediate trolley engaging link 190 and two complementary parallel connecting links 192,192 removably attached to, at, and above and below each end of the medial link 190. The medial link 190 comprises a body 194 having side walls 195,195 on either side of and defining the longitudinally extending through-slot 196, the upper and lower plate flanges 198,198 at the outer distal ends of the cylindrical stems 200 and the link end portions 202,202 having recesses 204 at each lateral side thereof. Slot 196 accepts the pendant member of the trolley, whereby the trolley 32 is engaged by the drive chain 34. Recesses 204 at each lateral side of the end portions 202,202 of the medial link are designed to accept the drive sprocket teeth of power chain drive mechanism (not shown).

The connecting chain links 192 each comprise a body portion 208 having openings 210,210 transversely therethrough, adjacent each end portion 212, for acceptance of the medial link flanges 198,198. The connecting links 192 engage the medial link 190 by passing the flanges 198 through the slots 210 of the connecting links 192 in a right angle attitude until the end portions seat on the cylindrical posts 200. The links 192 are then rotated until they are substantially aligned with but offset to the medial link 190, as illustrated in FIG. 28. The connecting links 192 will then be operatively engaged upon the cylindrical posts 200 under the flanges 198.

Figure 30A:
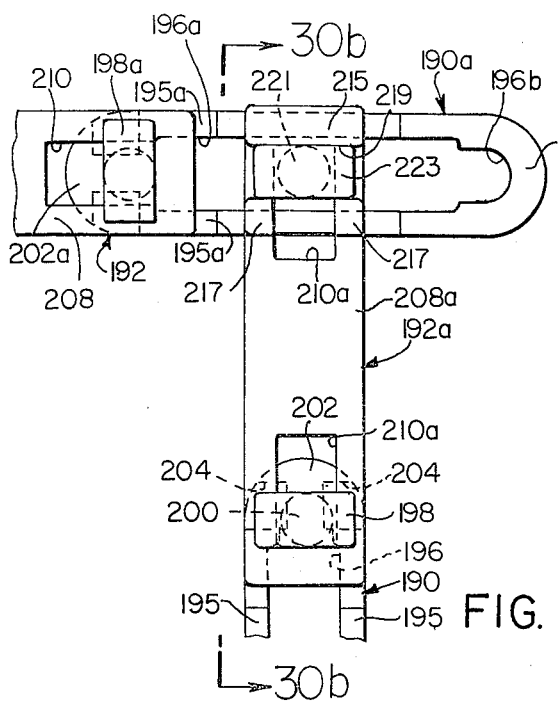
FIG. 30A is a top plan view of the special linkage closing the drive chain into an endless loop, at a right angle relationship.
Figure 30B:
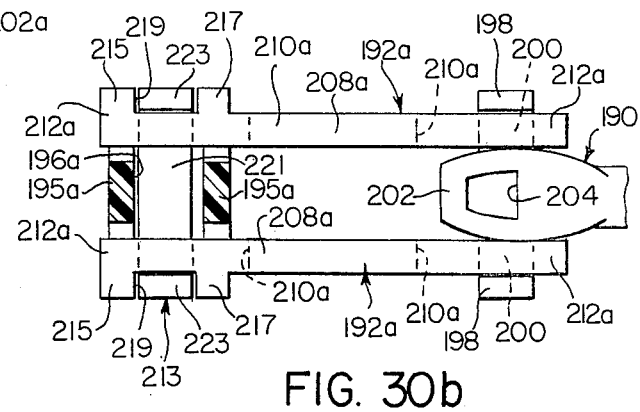
FIG. 30B is a side elevational view, partially in section, taken substantially on the line 30B—30B of FIG. 30A.
Figure 30C:
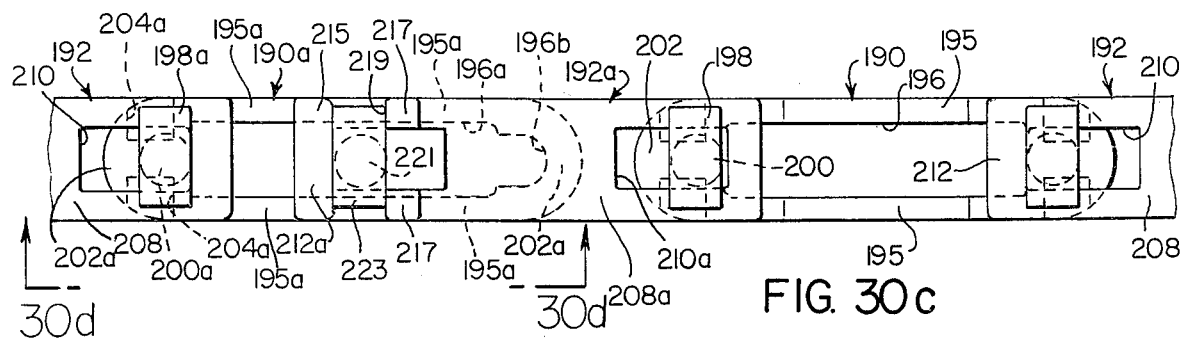
FIG. 30C is a top plan view of the special linkage closing the drive chain, now in alignment.
Figure 30D:
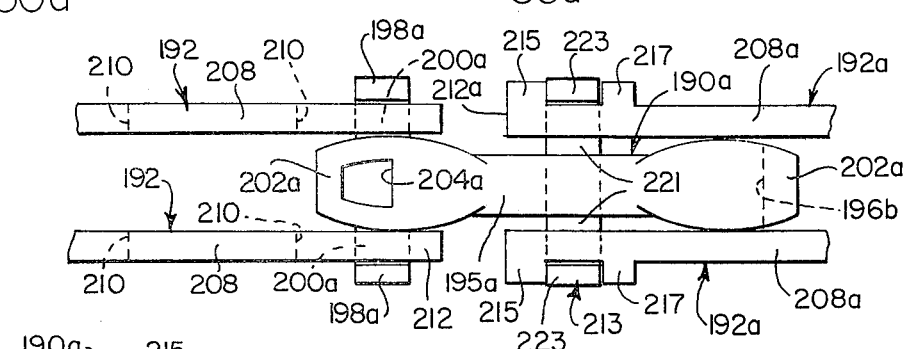
FIG. 30D is a side elevational view of the linkage shown in FIG. 30C.
Figure 30E:
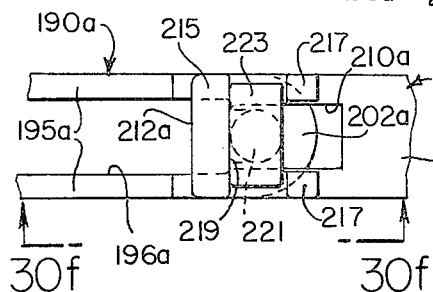
FIGS. 30E and 30F are fragmentary top plan and side elevational views respectively of the closing linkage shown in FIG. 30D, in extended posture.
Figure 30F:
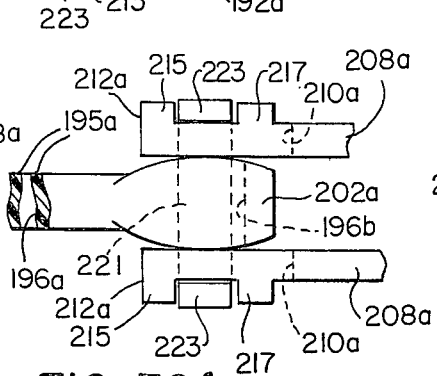
Figure 30G:
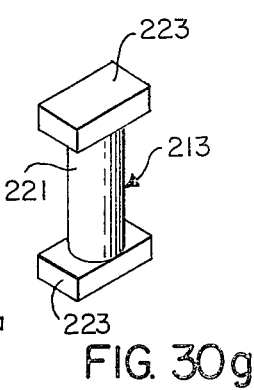
FIG. 30G is a perspective view of the locking link component of the special linkage closing the drive chain loop.
Figure 31:
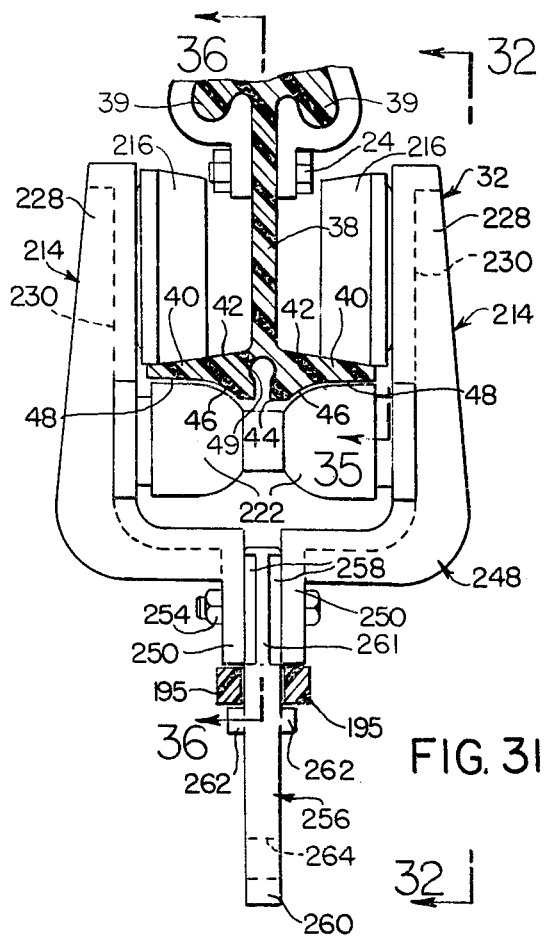
FIG. 31 is a front elevational view of a plastic trolley for the plastic T-bar monorail, forming components of the conveyor structure.
Figure 32:
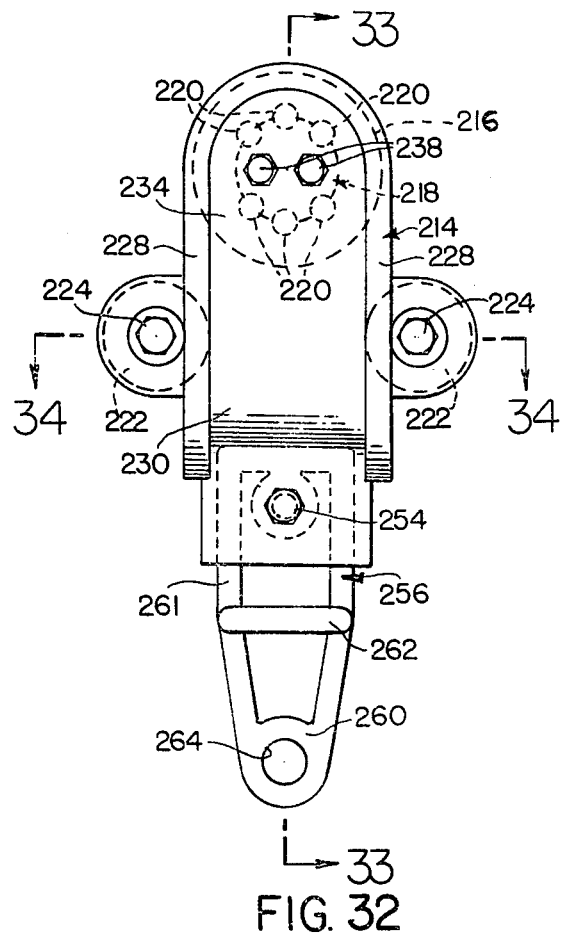
FIG. 32 is a side elevational view taken substantially on the line 32—32 of FIG. 31.
Figure 33:
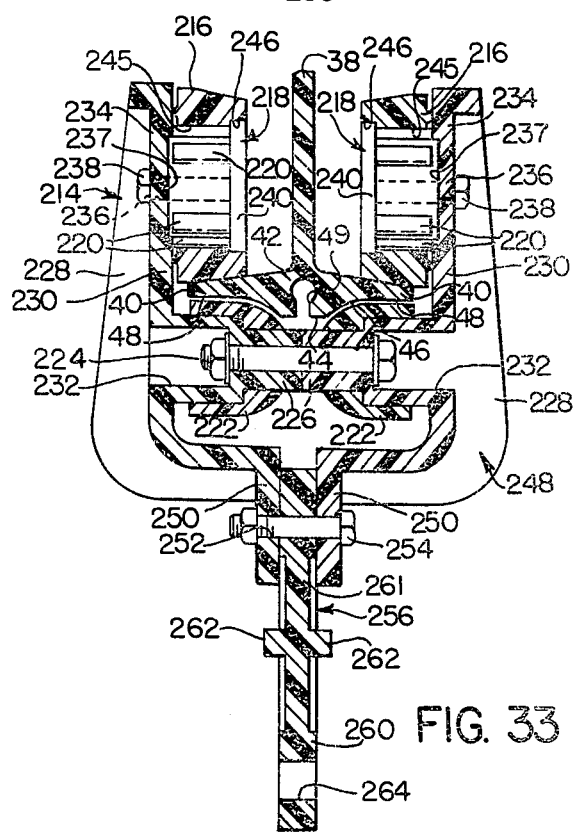
FIG. 33 is a vertical sectional view taken substantially on the line 33—33 of FIG. 32.
Figure 34:
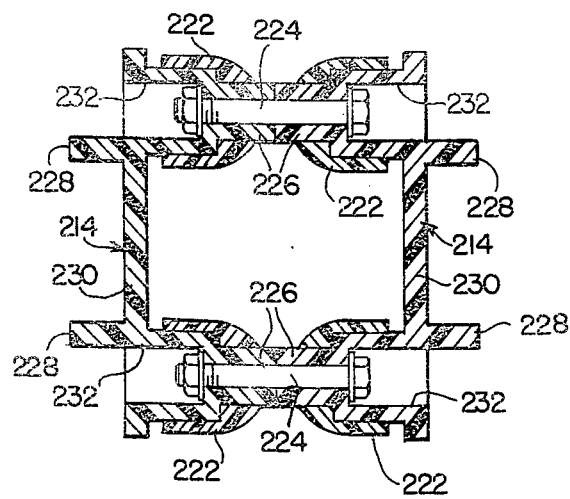
FIG. 34 is a horizontal sectional view taken substantially on the line 34—34 of FIG. 32.
Figure 35:
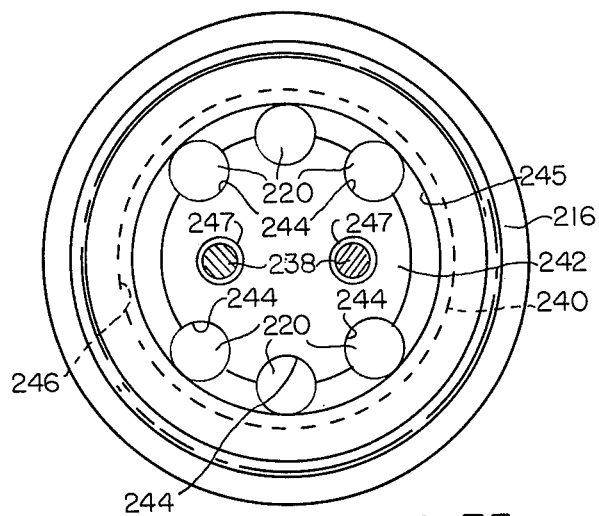
FIG. 35 is an end elevational view of the trolley stub axle, bearings and upper wheel taken substantially on the line 35—35 of FIG. 31.
Figure 36:
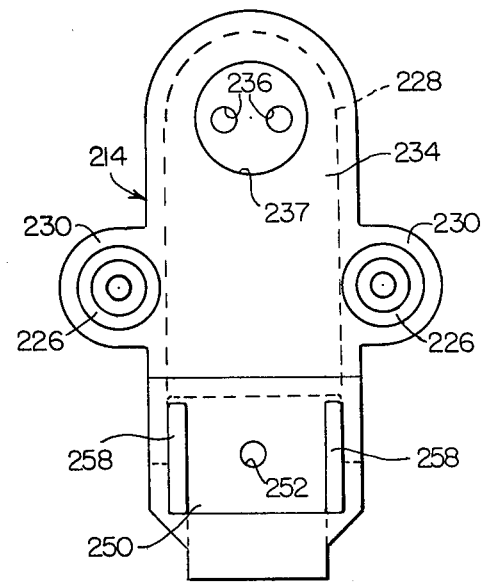
FIG. 36 is an inside elevational view of the righthand trolley arm illustrated in FIG. 31, showing its interior facing surfaces.
Figure 37:
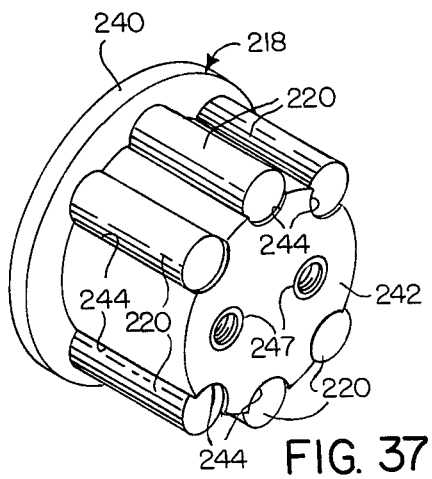
FIG. 37 is a perspective view of the stub axle with its roller bearings in position.
Figure 38:
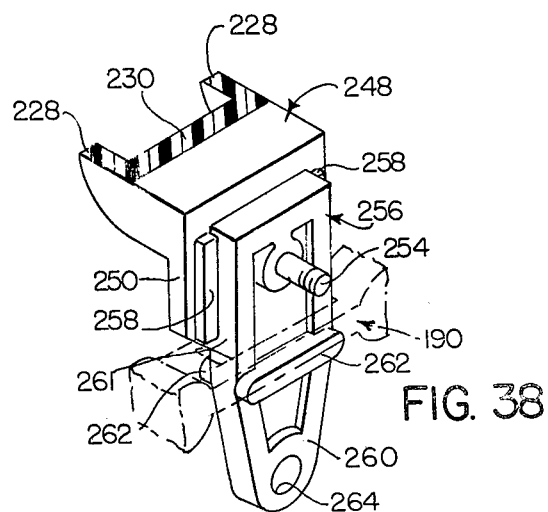
FIG. 38 is a perspective view of the pendant member attached to the lower depending portion of a trolley arm.
Figure 39:
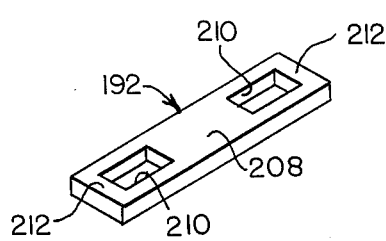
FIGS. 39 and 40 are perspective views of the medial and connecting links respectively illustrated in FIGS. 28, 29 and 30.
Figure 40:
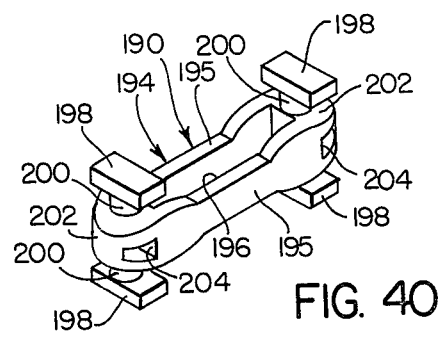

The plastic drive chain 34 is closed and formed into an endless loop by a pair of special plastic connecting links 192A,192A (FIGS. 30A,30B) engaged together upon one end of a special medial link 190A by the locking pin 213 (FIG. 30G). As shown in these drawing views (FIGS. 30A-G inclusive), the connecting links 192A are each provided with a body 208A having a longitudinally extending slot 210A adjacent each end thereof transversely therethrough for passage of the locking pin 213. At one end 212A, adjacent slot 210A and one side of the body 208A, are (a) the distal end boss 215 and (b) the spaced apart parallel aligned bosses 217,217 defining a recess 219 therebetween transversely over the slot 210A. The opposite end of the special links 192A is identical with that of the regular connecting links 192, engaging the next adjacent regular medial link 190.

The plastic locking pin 213 comprises a substantially cylindrical post 221 topped at each end by the plate flanges 223,223 (comparable to the flanges 198 of the link 190), which extend beyond the perimeter of the post 221 at least in one direction. The distal ends 212A of the special connecting links 192A,192A engage the locking pin about its post 221 and under the flanges 223,223 by placing the two links at right angles to and medially of the medial link 190A (FIGS. 30A,30B) to which they are to be connected. The slots 210A, 210A are then in longitudinal register with the special medial link slot 196A. The locking pin 213 is inserted through the slots 210A,196A and 210A, its flanges 223,223 coming to rest between the bosses 215 and 217 of each link 192A. The links 192A and locking link 213 are then rotated simultaneously into alignment with and about the special medial link 190A (FIGS. 30C,30D) and drawn outwardly with respect thereto until the locking pin post 221 seats in the distal recess 196B of slot 196A in the medial link 190A (FIGS. 30E,30F). The special connecting links 192A and special medial link 190A are then in alignment with the regular chain sets to close and form the endless drive chain loop 34.

The plastic conveyor trolleys 32 (FIGS. 31-38) each comprises a pair of complementary side arms 214,214, the upper trolley wheels 216 rotatably mounted on the stub axles 218 supporting bearings 220, the lower wheels 222 and fasteners 224 securing the side arms together in mating facing relationship at the lower wheel bearings 226. The trolley side arms 214 are provided with lateral flanges 228 extending outwardly from the body portion 230 having recesses 232,232 for the admission of fasteners 224. The upper portion 234 of the side arm body is provided with openings 236 for admission of fasteners 238 therethrough for securement of the stub axle 218 to the upper body portion 234 in its counterbore or recess 237.

The plastic stub axle 218 is provided with a distal flange 240, the axle body 242 and a plurality of axially extending recesses 244 in and about the periphery of the body for the bearings 220. The upper trolley wheels 216 are rotatably mounted and supported at their bores 245 upon the bearings 220 and retained thereon by the stub axle flange 240 seated in the wheel recess or counterbore 246. The bearings 220 are of a length slightly less than the linear length of the bearing recesses 232, and the stub axle body 242 may be fitted with threaded brass inserts 247 (FIGS. 25,27) to threadedly receive the bolt fasteners 238.

The lower portion 248 of the side arm 214 is provided with a depending flange 250 having a bore 252 therethrough for the fastener 254 by which the pendant member 256 is suspended. The side arm depending flange 250 is also provided with inwardly facing ribs 258 spaced apart from each other for admission and securement of the pendant 256 therebetween, to limit and prevent rotation of the pendant member in parts hanger supporting operation. Parts hanger devices are suspended from the lower portion 260 of the pendants in accordance with conventional practice. The pendant 256 is also provided with a generally horizontally extending rib 262 on either side thereof (FIG. 38) upon which the drive chain medial link 190 may rest. A fastener to suspend a parts hanger 266 (FIG. 1) is passed through the opening 264 in the lower pendant portion 260 of the trolley for attachment of the hanger therefrom.

The plastic supporting structural members 18,20,22, and 183 are preferably made of the Zytel ® or Delrin ® plastic materials, or other suitable equivalent materials, as integrally molded, unitary components. In the case of channel, H-bar sections, rods, angles or other similar longitudinally extending members, such plastic components can also be fabricated by an extrusion process.

The plastic conveyor monorail components such as the inverted T-bar sections 30,50,50A and 50B, the key slot pin 51, the elements of the turn wheel 60, and the trolley arcuate supporting plate 66, are also preferably produced as integrally molded, unitary plastic units of similar materials. The plastic connectors, fittings and supporting components such as the bracket members 28, the I-beam 78, the clamp type hanger 70, the right angle yoke connector 90, the splice connector 100, the plate connector 114, the angle bracket connector 124, the plate connector 136, the angle bracket 148, the sway brace 176, and other similar connector fittings are also preferably fabricated as integrally molded, unitary elements or components of the plastic monorail conveyor system, from the preferred Zytel ® or Delrin ® materials or their equivalents. Some of these plastic connectors, fittings and supporting components can also be fabricated by the extrusion process and cut to suitable length.

The plastic trolley 32 comprises a group of plastic components which are preferably made by the molding process as integrally molded, unitary elements. These include the side arms 214, the upper wheels 216, the stub axles 218 and bearings 220, the lower T-bar engaging wheels 222, and the pendant member 256, operatively secured together by conventional fasteners 224, 238 and 254.

The drive chain linkage 190,192,192A and 213 are each unitary, integrally formed, molded components of the drive chain 34, fabricated of one of the same plastic materials described above.

A particular advantage of the lobed T-bar monorail track lies in its facile attachment and support by bracket members or segments that are easily and readily fastened to the monorail section at the desired or required position of support. In some instances, such as at positions intermediate the ends of a T-bar section, it may not be necessary to bolt the bracket members to the T-bar stem because the lobe recess portions of such members, without fasteners, will adequately engage and secure the lobes of the T-bar section and prevent dislocation of the track section. Bolt openings can be readily drilled through the T-bar stem and the bracket members, when fasteners are necessary or desirable.

The connector bracket members or segments described hereinabove, when made as a single component, can be slid into position on the T-bar section by inserting an end of the section into the spacing between the lateral segments of the bracket or fitting so that the upstanding ribs enter the recesses 41 under the lobes 39 to engage and support the track section.

The monorail conveyor structure 10 herein disclosed particularly lends itself to facile erection and installation with conventional bolt, washer and nut fasteners by relatively unskilled labor. Additionally, replacement of damaged or worn components of the system are easily and readily made by the same personnel, in view of the fact that the plastic components are of much lesser weight than similar components of steel. The weight ratio for the preferred plastic materials in comparison with steel is about 1 to 5.

The curved or arcuate T-bar segments or sections 50, 50a or 50b as illustrated and described herein have lateral lobes 53, 53a and 53b respectively on each side of the T-bar stem 52, 52a or 52b respectively. Such T-bar sections can be molded with intricate tooling. However, arcuate T-bar sections without the lobes will function satisfactorily, though they will require fasteners 24 to secure supporting brackets and other structural members to the T-bar stem.

Having disclosed herein certain particular preferred embodiments of the invention for purposes of explanation, further modifications or variations thereof, after study of this specification, will or may occur or become apparent to persons skilled in the art to which the invention pertains. Reference should be had to be appended claims in determining the scope of the invention.

I claim:

1. A monorail conveyor structure comprising
   a longitudinally extending plastic inverted T-bar monorail track comprising
   a plurality of straight sections spliced together in longitudinally extending abutting end-to-end relationship, and a plurality of linearly arcuate sections spliced in end-to-end abutting relationship with at least some of said straight sections,
   each said T-bar monorail track straight or arcuate section comprises
   a longitudinally extending upstanding stem and a laterally outwardly directed flange extending from each side and at the distal end of said stem, said flanges lying substantially in a plane transversely of said stem, the upper surfaces of said flanges being inclined slightly downwardly from said stem, a substantially medial longitudinally extending web portion between said flanges therebelow, each said flange having an upwardly laterally outwardly curved underside surface portion adjacent and at each side of said web portion, blending into a substantially planar underside surface portion extending laterally outwardly to the distal edge of said flange,
   means affixed to and supporting said track in an elevated attitude,
   and a plurality of plastic conveyor article-suspending trolleys operatively translatable on said track, and comprising
   a pair of complementary, opposedly facing, plastic, easily detachably conjoined trolley arms, each having an upper portion, an intermediate portion and a lower end portion, a plastic trolley upper wheel freely rotatable on each said trolley arm and in rolling bearing contact upon said flange upper surfaces,
   a plastic stub axle for each said trolley upper wheel easily removably attached to and adjacent the inward face of the upper portion of each said trolley arm,
   a pair of plastic trolley lower wheels easily removably and rotatably mounted on each said trolley arm in parallel spaced apart relationship,
   abutting bearing portions for each said pair of lower wheels projecting inwardly from the intermediate portion of each said trolley arm,
   means detachably connecting said trolley arms together at said abutting bearing portions,
   said bearing portions for each said pair of trolley lower wheels being aligned axially and in abutting inner end-to-end relationship,
   means intermediate the ends of said bearing portions limiting laterally outward travel of said trolley wheels said upwardly laterally outwardly curved underside surface portions of said flanges limiting laterally inward travel of said lower wheels,
   said two pairs of lower wheels rotatable in a common plane below and substantially parallel with the plane of said upper wheels,
   said lower wheels being shaped to cooperatively function with said track underside surface portions, a pendant member removably secured to and between the conjoined lower end portions of said trolley arms, and a power activated drive chain operatively engaged with said trolley to translate the same on said track.

2. The monorail structure defined in claim 1, wherein said longitudinally extending upstanding stem is further provided with
   a longitudinally extending pendant lobe on each side of, spaced outwardly from, and substantially in parallel with the lateral surfaces of said stem.

3. The monorail structure defined in claim 2, wherein said means affixed to and supporting said inverted T-bar monorail track comprises
   a configuration of plastic structural members including channels, angles, and splicing and connector bracket members and fittings conjoining said monorail sections together into a track and said track to a supporting superstructure, said structural members being fabricated of a plastic material.

4. The monorail structure defined in claim 3, wherein said plastic connector fittings include yoke type bracket members having parallel spaced apart plate sections engageable with said T-bar upstanding stem on either side thereof when secured thereto by suitable fasteners.

5. The monorail structure defined in claim 4, wherein said bracket segments of said yoke type bracket members overlie, engage and splice together end portions of adjacent, end-to-end abutting T-bar monorail track sections, said end portions, when spliced together, having the surfaces of their contiguous stems, lobes and flanges lying substantially in aligned planes.

6. The monorail structure defined in claim 3, wherein said plastic connector fittings include clamp type brackets having parallel plate sections engageable with said lobes of said T-bar upstanding stem on either side thereof and with a supporting structural member thereabove.

7. The monorail structure defined in claim 3, wherein said plastic connector fittings include complementary sway brace members having matching sections engageable with T-bar monorail track supporting rods on either side thereof when said complementary matching sections are secured together by suitable fasteners about portions of said supporting rods to maintain them in a substantially fixed relationship.

8. The monorail structure defined in claim 3, wherein said plastic structural members include plastic I-beams and H-bars.

9. The monorail structure defined in claim 1, wherein said T-bar monorail straight and arcuate sections form an endless loop of monorail track.

10. The monorail structure defined in claim 1, wherein
said T-bar monorail sections form a monorail track of finite length.

11. The monorail structure defined in claim 1, wherein
said stub axle has a body portion and an annular flange retainer for said trolley upper wheel at the distal end of said body portion.

12. The monorail structure defined in claim 11, wherein
the proximal end of said stub axle body portion is secured to and upon said trolley arm upper portion.

13. The monorail structure defined in claim 11, including
a plurality of plastic cylindrical roller bearings freely rotatably disposed in the perimetric surface of said stub axle body portion,
said trolley upper wheel being freely rotatable upon said roller bearings.

14. The monorail structure defined in claim 13, wherein
said roller bearings are disposed in axially parallel relationship about and in the perimetric surface of said stub axle body portion.

15. The monorail structure defined in claim 14, wherein
said perimetric surface is provided with a plurality of axially parallel radially spaced apart longitudinally extending recesses seating said cylindrical roller bearings for rotation therein.

16. The monorail structure defined in claim 15, wherein
said recesses are semi-circular or arcuate in cross-sectional configuration.

17. The monorail structure defined in claim 15, wherein
said recesses are of a length slightly greater than the length of said roller bearings seated and rotatable therein.

18. The monorail structure defined in claim 15, wherein
the radially outward surfaces of said roller bearings, when seated in said stub axle perimetric surface recesses, define a cylindrical surface of revolution about said bearings concentric with the axis of said stub axle.

19. The monorail structure defined in claim 15, wherein
the radially outward surfaces of said roller bearings, when seated in said stub axle perimetric surface recesses, define a circle of rotation extending outwardly of the perimeter of said stub axle and within the inner cylindrical bore of said trolley upper wheel.

20. The monorail structure defined in claim 15, wherein
said recesses extend from the proximal end of said stub axle body portion to said annular flange retainer.

21. The monorail structure defined in claim 20, wherein
said annular flange retainer secures said trolley upper wheel for rotation on said roller bearings when said stub axle is secured to said trolley arm upper portion inward face.

22. The monorail structure defined in claim 15, wherein
said stub axle body portion functions as a support bearing or fixed race for said roller bearings.

23. The monorail structure defined in claim 1, and including
fastening means easily removably securing the proximal end of said stub axle to said trolley arm upper portion inward face,
fastening means easily removably securing each pair of said bearing portions of each said trolley arms in axial parallel alignment,
and fastening means securing said pendant to and between said trolley arm lower portions.

24. The monorail structure defined in claim 23, wherein
said stub axle body portion is provided with threaded metallic inserts for said fastening means.

25. The monorail structure defined in claim 1, wherein
each said pair of parallel spaced apart trolley lower wheels rotatably mounted on said bearing portions of one said trolley arm being engageable with and rotatable upon the underside surface of one said laterally outwardly extending T-bar monorail flange.

26. The monorail structure defined in claim 1, wherein
said power actuated drive chain comprises
a plurality of articulated plastic chain sets connected in an endless series, each said chain set comprising
a plastic medial or intermediate link engageable with one said plastic trolley,
and a pair of plastic connecting links articulatedly coupled to, above and below one end of an adjacent medial link.

27. The monorail structure defined in claim 26, wherein
said medial link comprises a body having
end portions and an intermediate longitudinally slotted portion therebetween, defined by a pair of lateral spaced apart side walls,
each said end portion having upper and lower posts and a flanged plate at the distal end of each said post,
said connecting links being easily detachably secured on said posts under and by said flanged plates.

28. The monorail structure defined in claim 27, wherein said end portion posts are substantially cylindrical, and said flanged plates are substantially rectilinear.

29. The monorail structure defined in claim 27, wherein
said medial link end portions are provided with recesses at each side thereof adapted to receive the sprocket teeth of power actuated chain drive mechanism, whereby said plastic chain drive is operatively engaged and driven.

30. The monorail structure defined in claim 27, wherein
each said connecting link comprises
a body having distal end portions and a longitudinally extending slot therethrough adjacent each said end portion,
said slot being of a dimension and shape such that said medial link flanged plate closely passes through said slot and engages said connecting link against removal or disengagement from one said post when said connecting link is generally aligned with the medial link of its chain set.

31. The monorail structure defined in claim 30, wherein
each said connecting link slotted end portion is rotatable on one said medial link post under its flange plate.

32. The monorail structure defined in claim 1, wherein
said monorail structure includes a plastic turn wheel freely rotatably mounted on said monorail track supporting means under and adjacent but spaced slightly from said track to guide and support said trolleys against disengagement from said track in their course of travel on and about an arcuate section of said track, said plastic turn wheel comprising
a plastic outer annular unit,
a plastic hub unit,
and means fixedly securing said outer annular unit to and concentrically with said hub unit.

33. The monorail structure defined in claim 32, wherein
said plastic outer annular unit having
an outer annular band,
an inner annular band,
a medial web section therebetween,
a plurality of radially extending ribs connected to said web section and said bands,
and an annular flange extending inwardly of and substantially medially from said inner annular band,
said plastic hub unit having
a cylindrical bore adapted to receive a shaft therethrough and for free rotation thereon, and an outer annular flange substantially medially of said hub unit,
and means fixedly securing said inner annular flange of said outer annular unit to and concentrically upon the outer annular flange of said hub unit.

34. The monorail structure defined in claim 1, wherein
said stem is further provided at its distal end with a key slot extending longitudinally of said web portion,
and a plastic pin press fit into said key slots of abutting track sections to maintain said track sections at planes of abuttment against sidewise misalignment.

35. The monorail structure defined in claim 1, wherein
said lower wheels are shaped to conform to said curved underside surface portions.

* * * * *